United States Patent [19]

Kurata et al.

[11] Patent Number: 5,483,517
[45] Date of Patent: Jan. 9, 1996

[54] MULTIPLEX TRANSMISSION APPARATUS

[75] Inventors: Yasuhiko Kurata, Higashihiroshima; Yuichi Akiyama, Kure, both of Japan

[73] Assignee: Mazda Motor Corporation and Naldec Corporation, Hiroshima, Japan

[21] Appl. No.: 274,724

[22] Filed: Jul. 18, 1994

[30] Foreign Application Priority Data

Jul. 19, 1993 [JP] Japan .................................. 5-177964

[51] Int. Cl.⁶ .............................. H04J 3/14; H04L 12/40
[52] U.S. Cl. ...................... 370/13; 370/85.2; 370/85.6; 307/10.1; 340/825.06; 340/825.51
[58] Field of Search .................................. 370/13, 14, 16, 370/85.1, 85.2, 85.3, 85.6, 85.7, 85.8, 95.1, 95.2, 100.1, 108; 340/825.06, 825.14, 825.17, 825.5, 825.51; 307/10.1, 36, 38, 39

[56] References Cited

U.S. PATENT DOCUMENTS

| | | | |
|---|---|---|---|
| 4,578,591 | 3/1986 | Floyd et al. | 307/10.1 |
| 4,747,097 | 5/1988 | Ohya et al. | 370/16 |
| 4,780,620 | 10/1988 | Högberg et al. | 370/85.1 |
| 5,263,022 | 11/1993 | Nobutoki et al. | 370/85.8 |
| 5,289,466 | 2/1994 | Nobutoki et al. | 370/85.2 |
| 5,343,470 | 8/1994 | Hideshima et al. | 370/85.1 |

FOREIGN PATENT DOCUMENTS 1-143535  6/1989  Japan .

*Primary Examiner*—Alpus Hsu

[57] ABSTRACT

The output interval between a signal for shifting a communication node from a sleep state to a wake-up state and a signal for operating an electrical component is set to be longer than the wake-up rise time of the communication node. After the communication node is reliably shifted to the wake-up state, an operation signal can be transmitted to the electrical component, and an unnecessary dark current can be prevented from being supplied to the communication node in the wake-up state.

8 Claims, 4 Drawing Sheets

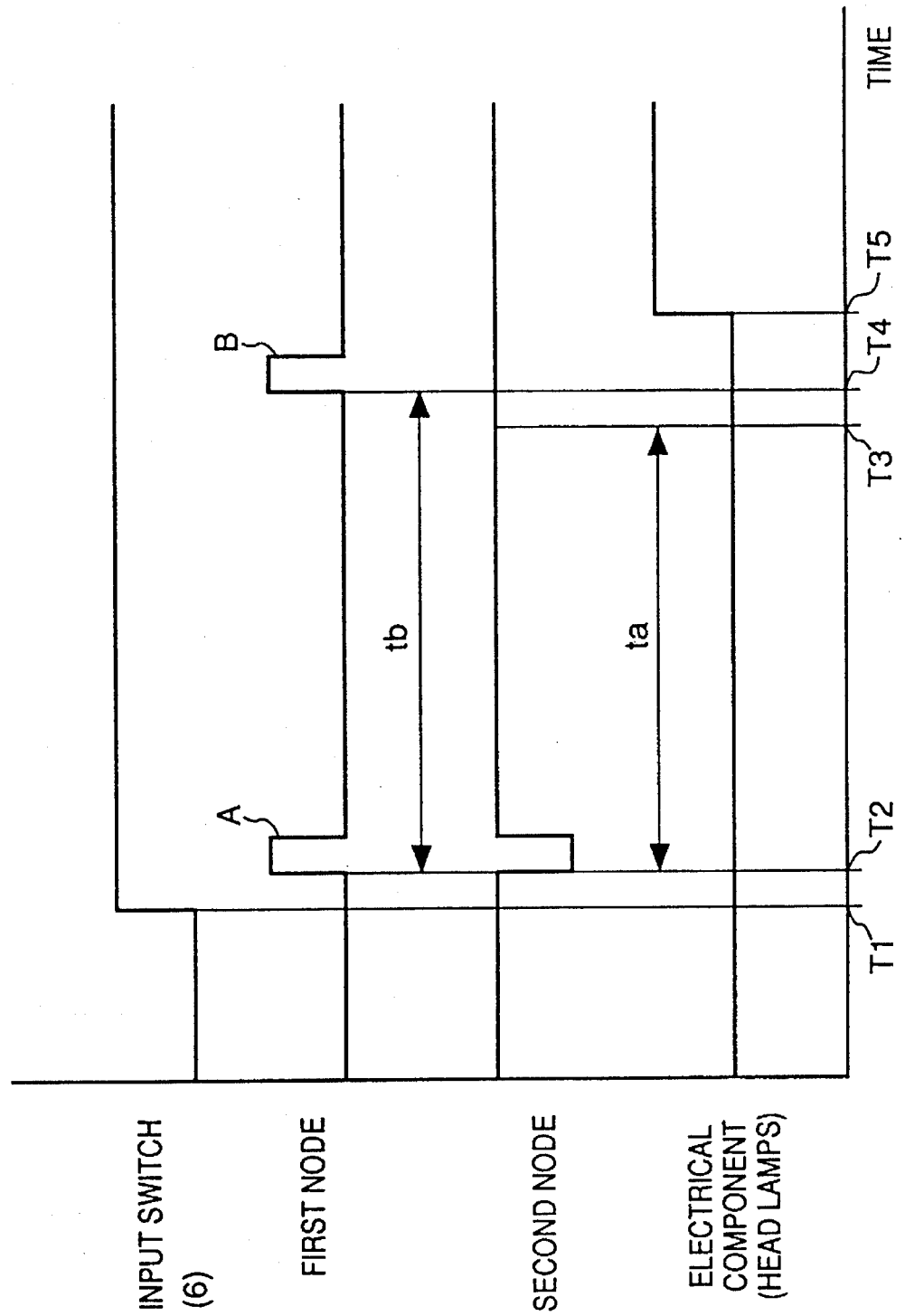

MULTIPLEX TRANSMISSION APPARATUS

BACKGROUND OF THE INVENTION

1. Field of the Invention

The present invention relates to a multiplex transmission apparatus which has a plurality of communication nodes connected via a multiplex bus, and outputs an operation command signal from a communication node connected to an input switch to another communication node connected to an electrical component via the multiplex bus.

2. Description of the Related Art

Conventionally, as disclosed in Japanese Patent Laid-Open No. 1-143535, a multiplex transmission system has been proposed. In this system, a plurality of communication nodes equipped in, e.g., a vehicle are connected in a network pattern using a common multiplex bus, and the multiplex bus is shared by a plurality of electrical components, thereby simplifying the harness structure for connecting the electrical components and input switches for operating these members.

The multiplex transmission system includes communication nodes which are set in a sleep state, i.e., an inoperative state when an ignition switch is turned off, and communication nodes which are set in a wake-up state, i.e., an operable state by a battery power supply even when the ignition key is not ON. Communication nodes for controlling electrical components such as door lock switches, head lamps, and the like, which must operate when the ignition switch is in an OFF state are maintained in the wake-up state by electrical power supplied from the battery power supply, thereby allowing operations of these electrical components.

When the communication nodes which are to be set in the wake-up state by the battery power supply are always maintained in the wake-up state, a dark current flows to waste battery power. For this reason, these communication nodes are designed to shift to the sleep state when the door locks are locked in the OFF state of the ignition switch, and to shift back to the wake-up state when a driver touches a door handle later.

In the conventional system with the above arrangement, when a person other than a driver accidentally touches a door handle, the communication nodes which are set in the wake-up state by the battery power supply shift from the sleep state to the wake-up state, thus wasting battery power. When a time interval from when the driver touches the door handle and the communication nodes shift to the wake-up state until required input switches are actually operated is long, a dark current which flows during this interval is wasted. On the contrary, when the above-mentioned time interval is short, an operation command signal of an electrical component is output before the communication nodes shift to the wake-up state, and this electrical component cannot often be properly operated.

For this reason, it is desired that when a driver performs a switch operation for operating an electrical component, the corresponding communication node is shifted to the wake-up state in response to this switch operation, and the electrical component corresponding to the operated switch can be quickly operated.

SUMMARY OF THE INVENTION

The present invention has been made in consideration of the above situation, and has as its object to provide a multiplex transmission apparatus which can properly shift each communication node to a wake-up state, and can effectively reduce the dark current.

In order to achieve the above object, according to the present invention, there is provided a multiplex transmission apparatus which comprises a plurality of communication nodes connected to each other via a multiplex transmission path, and a plurality of electrical components to be controlled by the plurality of communication nodes, each of the plurality of communication nodes being set in one of an operative state, an inoperative state, and an operable state, comprising means for detecting if the communication nodes are in the inoperative state, means for discriminating a presence/absence of an operation command to the electrical component, means for, when the communication nodes are set in the inoperative state and the operation command is detected, generating a first signal for setting the communication nodes in the operable state so as to be delayed from the operation command, means for monitoring an elapse of a predetermined period of time from a generation timing of the first signal, and means for generating a second signal for operating the electrical component after the elapse of the predetermined period of time is detected and the communication nodes are set in the operable state.

Other features and advantages of the present invention will be apparent from the following description taken in conjunction with the accompanying drawings, in which like reference characters designate the same or similar parts throughout the figures thereof.

BRIEF DESCRIPTION OF THE DRAWING

FIG. 4 is a timing chart showing the control operation of the communication node.

DETAILED DESCRIPTION OF THE PREFERRED EMBODIMENT

Figure 1:
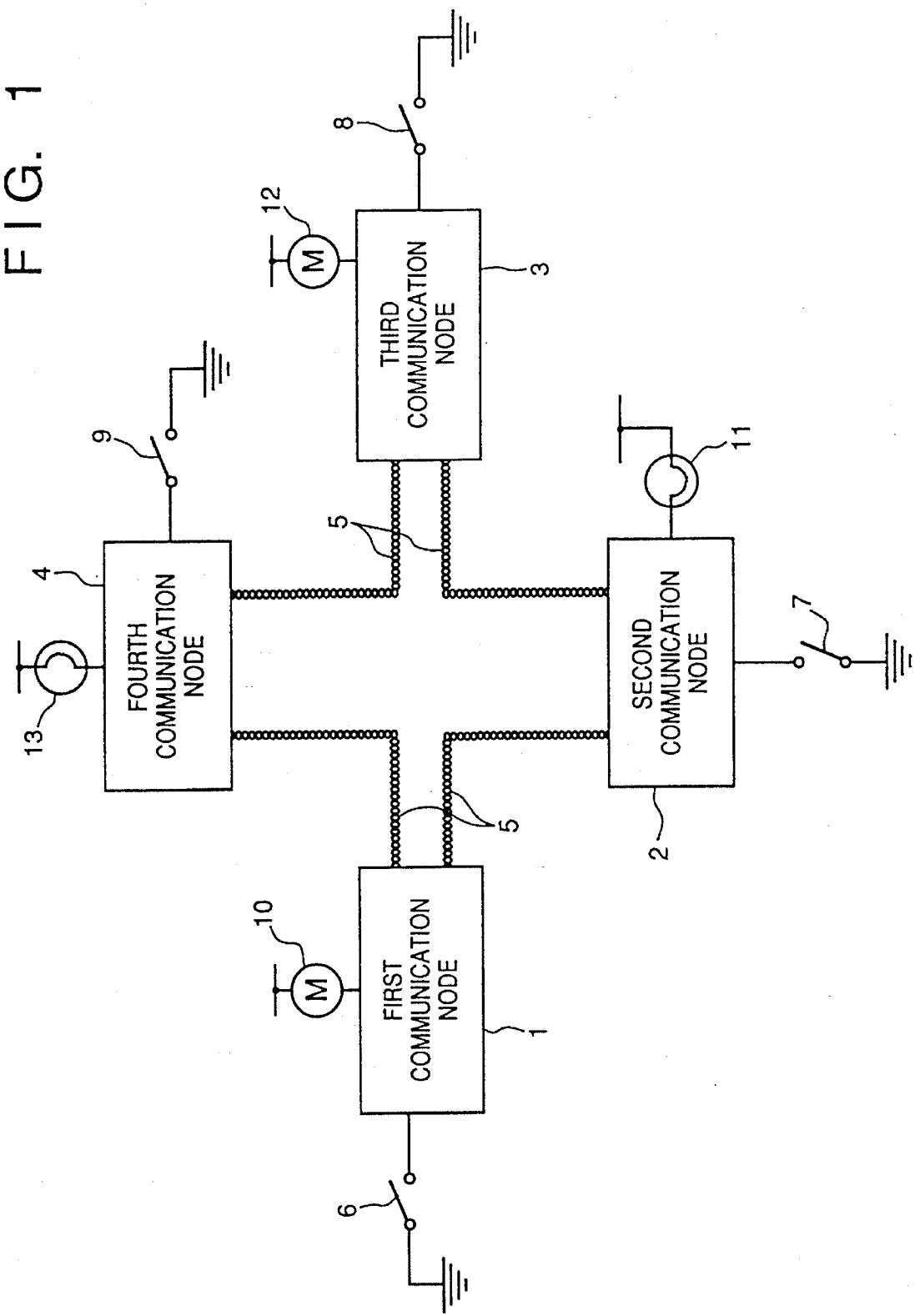
FIG. 1 is a block diagram showing the arrangement of the entire multiplex transmission apparatus according to the present invention.

FIG. 1 shows the arrangement of the entire multiplex transmission apparatus according to the present invention. The multiplex transmission apparatus comprises first to fourth communication nodes 1 to 4 equipped in, e.g., a vehicle, and multiplex buses 5 comprising twisted pair cables for connecting neighboring ones of the communication nodes 1 to 4. The communication nodes 1 to 4 are respectively connected to input switches 6 to 9 and electrical components 10 to 13. For example, the input switch 6 for operating head lamps is connected to the first communication node 1 arranged near an operation panel, and an electrical component 11 comprising the head lamps which are turned on upon operation of the input switch 6 are connected to the second node 2 arranged near the front portion of a vehicle body.

In this embodiment, a single input switch and a single electrical component are connected to each of the communication nodes 1 to 4. However, a plurality of input switches and electrical components may be connected to each of the communication nodes 1 to 4, or a connection portion of either one of the input switch or the electrical component may be omitted.

Figure 2:
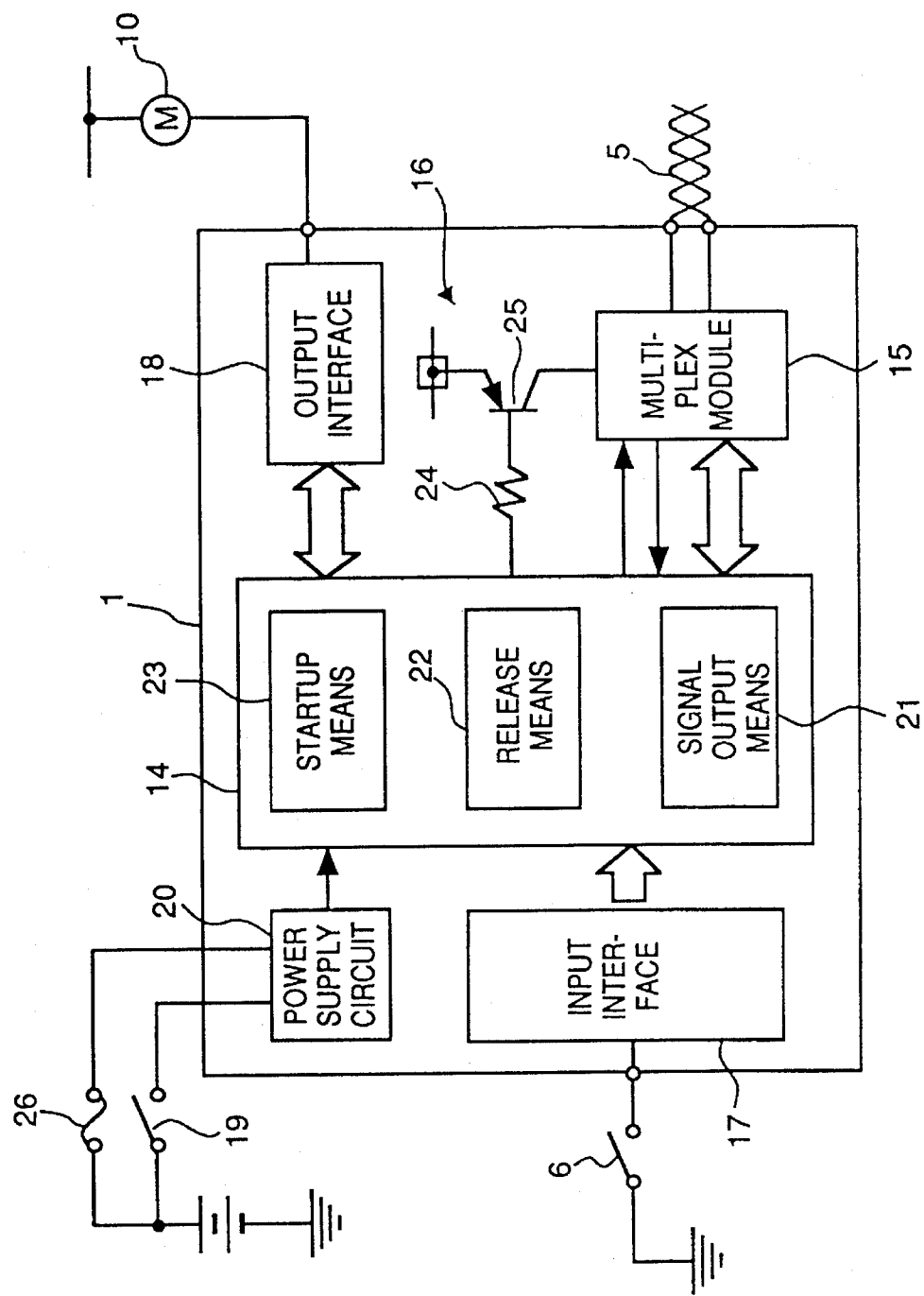
FIG. 2 is a block diagram showing the internal arrangement of a communication node.

As shown in FIG. 2, the first communication node 1 comprises a microcomputer 14, a multiplex module 15 connected to the microcomputer 14, for inputting/outputting a control signal consisting of multiplex signals, a wake-up circuit 16 for shifting the multiplex module 15 from a sleep state to a wake-up state, an input interface 17 for connecting the input switch 6 and the microcomputer 14, an output interface 18 for connecting the electrical component 10 and the microcomputer 14, and a power supply circuit 20 which is started in response to an operation of an ignition switch 19.

The microcomputer 14 of the first communication node 1 comprises a signal output means 21 for outputting a wake-up signal for shifting the communication nodes 1 to 4 from the sleep state to the wake-up state in response to an input signal from the input switch 6, and an operation command signal for turning on the electrical component 11 comprising the head lamps connected to the second communication node 2. The output interval between the wake-up signal and the operation command signal output from the signal output means 21 is set to be slightly longer than a time required for shifting each of the communication nodes 1 to 4 from the sleep state to the wake-up state, i.e., a wake-up rise time.

The microcomputer 14 also comprises a release means 22 for shifting the first communication node 1 in the wake-up state to the sleep state, and a startup means 23 for shifting the communication node 1 in the sleep state to the wake-up state. When it is confirmed that each of the communication nodes 1 to 4 ends the normal operation, and can be shifted to the sleep state, the release means 22 sets the microcomputer 14 in a low-current mode, and stops supply of a current to the multiplex module 15, as will be described later.

The startup means 23 shifts the microcomputer 14 and the multiplex module 15 of the first communication node 1 in the sleep state to the wake-up state in response to a wake-up signal which is input from another node connected to an input switch that corresponds to the electrical component 10 of the first communication node 1 via the multiplex bus 5 and the multiplex module 15.

The multiplex module 15 is connected to the neighboring second and fourth communication nodes 2 and 4 via the multiplex buses 5, and is connected to the third communication node 3 via these second and fourth communication nodes; 2 and 4. Also, the multiplex module 15 inputs a wake-up signal from each of these communication nodes 2 to 4 to the startup means 23 of the microcomputer 14, and outputs the wake-up signal and the operation command signal output from the signal output means 21 to the other communication nodes 2 to 4.

The wake-up circuit 16 has a transistor 25 connected to the release means 22 and the startup means 23 of the microcomputer 14 via a resistor 24. When it is confirmed that the normal operation of each of the communication nodes 1 to 4 ends, the wake-up circuit 16 increases the voltage applied to the base of the transistor 25 via the release means 22, thereby turning off the transistor 25. As a result, supply of a current to the multiplex module 15 is stopped, and the multiplex module 15 is shifted to the sleep state.

When a wake-up signal is input to the startup means 23 of the microcomputer 14, the voltage to be applied to the base of the transistor 25 of the wake-up circuit 16 decreases, thus turning on the transistor 25. As a result, a current is supplied to the multiplex module 15, and the multiplex module 15 is shifted to the wake-up state.

When the ignition key switch 19 is operated, the power supply circuit 20 outputs a command signal for forcibly setting the microcomputer 14 and the multiplex module 15 in the wake-up state. Since a fuse 26 is connected to the power supply circuit 20 in parallel with the ignition key switch 19, the power supply circuit 20 sets the fuse 26 in an OFF state until a vehicle begins to be used after the vehicle is manufactured, thereby preventing the first communication node 1 from being unnecessarily set in the wake-up state, and wasting of battery power.

The second to fourth communication nodes 2 to 4 have substantially the same arrangement as that of the first communication node 1, except for the types input switches and electrical components to be connected thereto.

Figure 3:
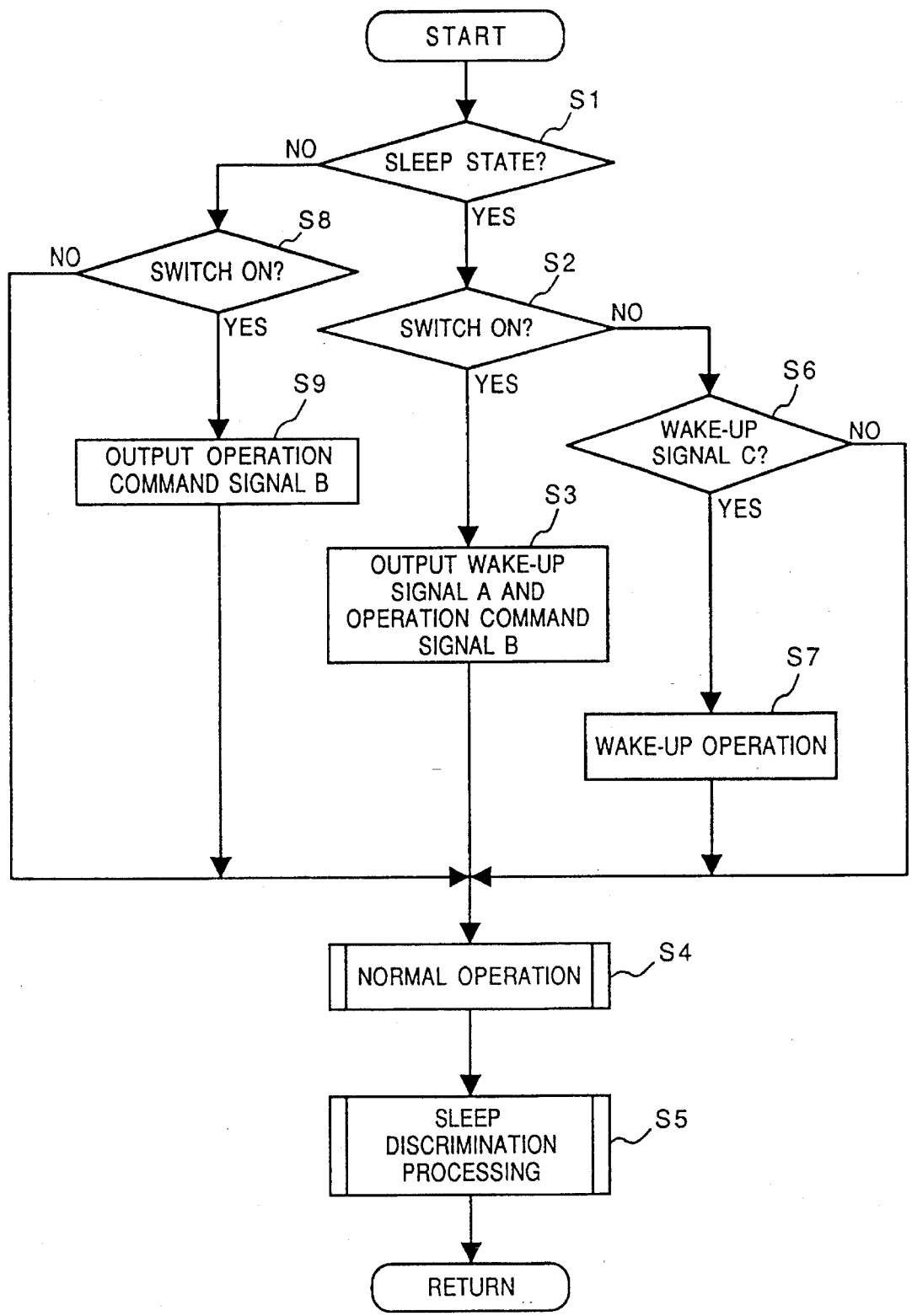
FIG. 3 is a flow chart showing a control operation of the communication node.

The control operation of the first communication node 1 with the above arrangement will be described below with reference to the flow chart shown in FIG. 3. When the control operation is started, it is checked in step S1 if the first communication node 1 is currently set in the sleep state. If YES in step S1, it is checked in step S2 whether the input switch 6 for operating the head lamps is turned on.

If YES in step S2, a wake-up signal A for shifting the communication nodes 1 to 4 from the sleep state to the wake-up state and an operation command signal B for turning on the electrical component (e.g. head lamps) 11 of the second communication node 2 are transmitted at a predetermined interval via the multiplex buses 5 in step S3. More specifically, the operation command signal B is output after an elapse of a time slightly longer than the wake-up rise time of each of the communication nodes 1 to 4 from when the wake-up signal A is output.

In step S4, a normal operation is executed for controlling the operating state of the electrical component 10 connected to the first communication node 1 in accordance with operation command signals output from the other communication nodes 2 to 4. Thereafter, sleep discrimination processing for discriminating if the normal operation ends, and for shifting the communication nodes 1 to 4 to the sleep state, as needed, is executed in step S5. Thereafter, the flow returns.

On the other hand, if NO in step S2, i.e., if it is confirmed that the input switch 6 is OFF, it is checked in step S6 whether a wake-up signal C for shifting the communication nodes 1 to 4 from the sleep state to the wake-up state is output from the other communication nodes 2 to 4. If YES in step S6, an operation for setting the microcomputer 14 and the multiplex module 15 in the wake-up state is executed in step S7, and thereafter, the flow advances to step S4.

If NO in step S1, i.e., if it is confirmed that the first communication node 1 is currently set in the wake-up state, it is checked in step S8 whether the input switch 6 for operating the head lamps is turned on. If YES in step S8, the operation command signal B for turning on the electrical component (e.g. head lamps) 11 of the second communication node 2 is output via the multiplex bus 5 in step S9, and thereafter, the flow advances to step S4.

As described above, if one of the input switches 6 to 9 is operated when the communication nodes 1 to 4 are set in the sleep state, the wake-up signal A and the operation command signal B are output at the predetermined interval. For this reason, the electrical components can be properly and quickly operated in response to the operations of the input switches 6 to 9.

More specifically, as shown in FIG. 4, at a timing T2 after an elapse of a predetermined period of time from a timing T1 at which the input switch 6 of the first communication node 1 is turned on, the first communication node 1 outputs the wake-up signal A to the other communication nodes 2 to 4. For this reason, upon reception of the wake-up signal A, the second communication node 2 starts an operation for shifting to the wake-up state, and at a timing T3 after an elapse of a wake-up rise time ta from the timing T2, the second communication node 2 is set in the wake-up state.

At a timing T4 after an elapse of a setting time tb longer than the wake-up rise time ta from the output timing T2 of the wake-up signal A, the operation command signal B is output for operating the electrical component 11 corresponding to the input switch 6. For this reason, at the output timing T4 of the operation command signal B, the second communication node 2 has already been set in the wake-up state. Therefore, at a timing T5 after an elapse of a predetermined period of time since reception of the operation command signal B, the communication node 2 can reliably operate the electrical component 11.

In addition, since the setting time tb of the output interval between the wake-up signal A and the operation command signal B is only slightly longer than the wake-up signal rise time ta, an unnecessary dark current can be prevented from flowing for a long period of time, and the electrical component 11 can be quickly operated as needed.

In this embodiment, when one of the communication nodes 1 to 4 is operated, all the communication nodes 1 to 4 are shifted from the sleep state to the wake-up state. Alternatively, only a communication node connected to an electrical component corresponding to the operated input switch may be shifted to the wake-up state. Also, the normal operation command signal B may be used as the wake-up signal A to be output from the signal output means 21, and the signal B may be successively output twice at a predetermined interval.

As described above, since the wake-up signal for shifting a communication node in the sleep state to the wake-up state in response to an operation of an input switch, and an operation command signal for operating an electrical component are output at a time interval longer than the wake-up rise time of the communication node, the communication node can be reliably shifted to the wake-up state in response to the wake-up signal, and thereafter, the operation command signal is output to reliably operate the electrical component corresponding to the input switch.

Since the output interval between the wake-up signal and the operation command signal is set to be longer than the wake-up rise time, the communication node can be prevented from being kept in the wake-up state for a long period of time. Therefore, the electrical component can be quickly operated as needed while effectively preventing an unnecessary dark current from flowing over a long period of time.

As many apparently widely different embodiments of the present invention can be made without departing from the spirit and scope thereof, it is to be understood that the invention is not limited to the specific embodiments thereof except as defined in the appended claims.

What is claimed:

1. A multiplex transmission apparatus which comprises a plurality of communication nodes connected to each other via a multiplex transmission path, and a plurality of electrical components to be controlled by the plurality of communication nodes, each of the plurality of communication nodes being set in one of an operative state, an inoperative state, and an operable state, comprising:

means for detecting in a communication node whether the plurality of communication nodes including said communication node are in the inoperative state;

instructing means, connected to said communication node, for instructing an operation of the electrical components;

means for discriminating one of a presence and an absence of an instruction sent from said instructing means to the plurality of communication nodes to which the electrical components are connected;

means for, when said plurality of communication nodes and the communication node are detected to be in the inoperative state and the presence of the instruction is discriminated, generating a first signal for setting said plurality of communication nodes including said communication node in the operable state, a generation timing of said first signal being delayed from the time when said instruction is issued;

means for monitoring an elapse of a predetermined period of time which is started at the generation timing of the first signal; and means for generating a second signal for operating the electrical components which are connected to said plurality of communication nodes, after the elapse of the predetermined period of time is detected and the communication nodes are set in the operable state.

2. The apparatus according to claim 1, wherein said first and second signals are output from a single communication node.

3. The apparatus according to claim 1, wherein said first signal is a signal for setting a communication node associated exclusively with control of a designated electrical component from the inoperative state to the operable state.

4. The apparatus according to claim 1, wherein said second signal for operating the electrical components is used as said first signal, and said second signal is output twice at an interval of said predetermined period of time.

5. A multiplex transmission apparatus having a first communication node and a second communication node, said first and second communication nodes being connected to each other via a multiplex transmission path, in which an operation of an electrical component connected to the second communication node is controlled in accordance with an operation instruction issued by operation instruction means connected to the first communication node, said first communication node comprising:

means for detecting one of a presence and an absence of the instruction issued by said operation instruction means;

means for detecting whether said second communication node is in an inoperative state;

means for, when said second communication node is detected to be in the inoperative state and the presence of the instruction is detected, generating a first signal for setting said second communication node in an operable state;

means for discriminating whether said second communication node is in the operable state after said first signal has been generated; and means for, after said second communication node has been in the operable state, generating a second signal indicative of the operation instruction issued by said operation instruction means so as to operate the electrical component.

6. The apparatus according to claim 5, wherein said second communication node is discriminated to be in the operable state on the basis of an elapse of a predetermined period of time after said first signal has been generated.

7. The apparatus according to claim 5, wherein said first and second signals are output from a single communication node.

8. The apparatus according to claim 5, wherein said second signal for operating the electrical component is used as said first signal, and said second signal is output twice at an interval of said predetermined period of time.

* * * * *